United States Patent
Weckerling et al.

(10) Patent No.: US 6,848,999 B2
(45) Date of Patent: Feb. 1, 2005

(54) COUNTER-TRACK JOINT HAVING IDENTICALLY ORIENTATED OPPOSED PAIRS OF TRACKS

(75) Inventors: Thomas Weckerling, Lohmar (DE); Stephan Maucher, Siegburg (DE); Anna Gremmelmaier, Sankt Augustin (DE); Herbert Taureg, Hennef (DE)

(73) Assignee: GKN Automotive GmbH (DE)

( * ) Notice: Subject to any disclaimer, the term of this patent is extended or adjusted under 35 U.S.C. 154(b) by 0 days.

(21) Appl. No.: 10/434,905

(22) Filed: May 9, 2003

(65) Prior Publication Data

US 2004/0033837 A1 Feb. 19, 2004

(30) Foreign Application Priority Data

May 10, 2002 (DE) ......................................... 102 20 711

(51) Int. Cl.[7] ............................................... F16D 3/224
(52) U.S. Cl. ...................................... 464/111; 464/906
(58) Field of Search ................................. 464/145, 906

(56) References Cited

U.S. PATENT DOCUMENTS

| | | | | |
|---|---|---|---|---|
| 2,325,460 A | * | 7/1943 | Amberg | .................. 464/145 X |
| 3,475,924 A | * | 11/1969 | Aucktor | .................. 464/145 X |
| 5,221,233 A | * | 6/1993 | Jacob | ......................... 464/145 |
| 6,120,382 A | * | 9/2000 | Sone et al. | .................. 464/145 |
| 2002/0077186 A1 | * | 6/2002 | Hosoya et al. | ............... 464/145 |
| 2002/0193166 A1 | * | 12/2002 | Cermak | ...................... 464/145 |
| 2004/0005930 A1 | * | 1/2004 | Weckerling et al. | |

* cited by examiner

Primary Examiner—Greg Binda

(57) ABSTRACT

A constant velocity fixed ball joint in the form of a counter-track joint comprising an outer joint part with outer tracks, an inner joint part with inner tracks, torque-transmitting balls accommodated in pairs of tracks, and a ball cage with cage windows in which the balls are held in a common plane. First outer tracks and first inner tracks form first pairs of tracks which diverge from one another running in a first axial direction towards the connection end of the inner joint part and hold first balls. Second outer tracks and second inner tracks form second pairs of tracks which diverge from one another running in a second axial direction towards the connection end of the outer joint part and hold second balls. First pairs of tracks are positioned radially opposite other first pairs of tracks, and second pairs of tracks are positioned radially opposite other second pairs of tracks.

4 Claims, 5 Drawing Sheets

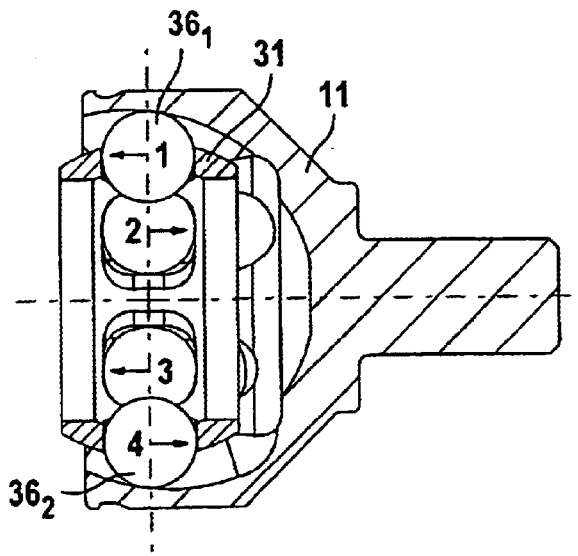
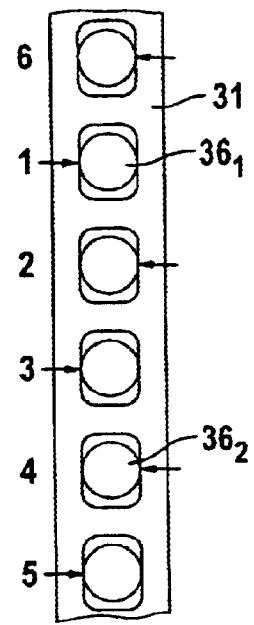
Fig. 2A
PRIOR ART
Fig. 2B
PRIOR ART
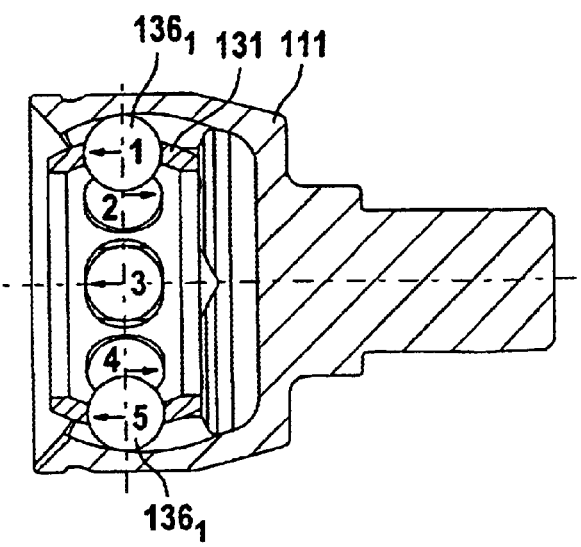
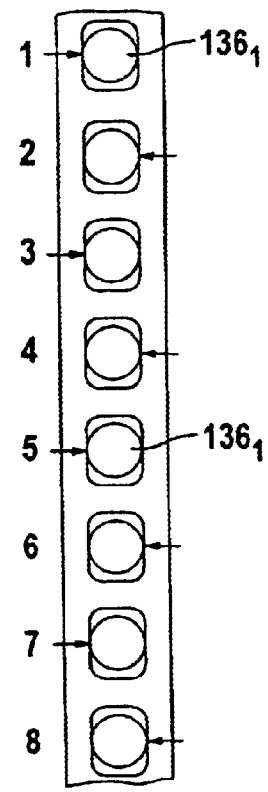
Fig. 5A
Fig. 5B

US 6,848,999 B2

COUNTER-TRACK JOINT HAVING IDENTICALLY ORIENTATED OPPOSED PAIRS OF TRACKS

TECHNICAL FIELD

The invention relates to a constant velocity fixed ball joint in the form of a counter-track joint comprising an outer joint part with outer tracks, an inner joint part with inner tracks, torque-transmitting balls accommodated in pairs of tracks consisting of outer tracks and inner tracks, and a ball cage with cage windows in which the balls are held in a common plane and guided on to the angle-bisecting plane when the joint is articulated. First outer tracks, together with first inner tracks, form first pairs of tracks which diverge from one another along a first axial direction towards the connection end of the inner joint part and hold first balls. Second outer tracks, together with second inner tracks, form second pairs of tracks which diverge from one another along a second axial direction towards the connection end of the outer joint part and hold second balls.

BACKGROUND OF THE INVENTION

Counter-track joints of the above-mentioned type are advantageous in that the balls alternately circumferentially arranged in first pairs of tracks and second pairs of tracks are subjected, via the tracks, to forces which alternately point in a first direction and in a second direction. The forces are accommodated by counter-forces of the ball cage which are balanced in the form of internal forces, so that the cage is not subjected to any external axial forces. The cage thus runs in a relatively friction-free way relative to the outer joint part. Presently, for production and assembly reasons and with reference to the preferred ball sizes, it has been common practice with joints according to the state of the art that opposite a first pair of tracks widening in a first direction, there is arranged, radially opposite thereto, a second pair of tracks widening in a second direction. This design has disadvantages with regard to joint control, i.e., the control force conditions at the cage. However, accurate cage control is desired in order to be able, at any time when the joint is articulated, to guide the balls in their entirety with sufficiently high control forces on to the angle-bisecting plane which symmetrically divides the angle between the axes of the outer joint part and the inner joint part. The reasons for the disadvantageous control conditions in joints according to the state of the art will be explained in greater detail later with reference to the drawings.

SUMMARY OF THE INVENTION

The present invention provides a counter-track joint with improved control characteristics. The counter-track joint includes first pairs of tracks positioned radially opposite other first pairs of tracks, and second pairs of tracks positioned radially opposite other second pairs of tracks. More particularly, the first pairs of tracks and second pairs of tracks are arranged so as to alternate across the circumference of the joint. In one embodiment, a joint with eight uniformly circumferentially distributed pairs of tracks is disclosed. Other joint embodiments include twelve or sixteen pairs of tracks. An inventive joint is characterised by resulting control forces which constantly deviate from zero, and which are applied by pairs of tracks to the respective opposed pairs of balls, so that, overall, control conditions can be improved substantially. The reasons for such improved control force conditions will be explained below with reference to the drawings.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings:

FIG. 2 shows a joint according to FIG. 1, illustrating the axial ball forces:
 A) in a longitudinal section; and
 B) in a developed view of the cage.

FIG. 5 shows a joint according to FIG. 4, illustrating the axial ball forces:
 A) in a longitudinal section; and
 B) in a developed view of the cage.

DETAILED DESCRIPTION OF THE INVENTION

Figure 1A:
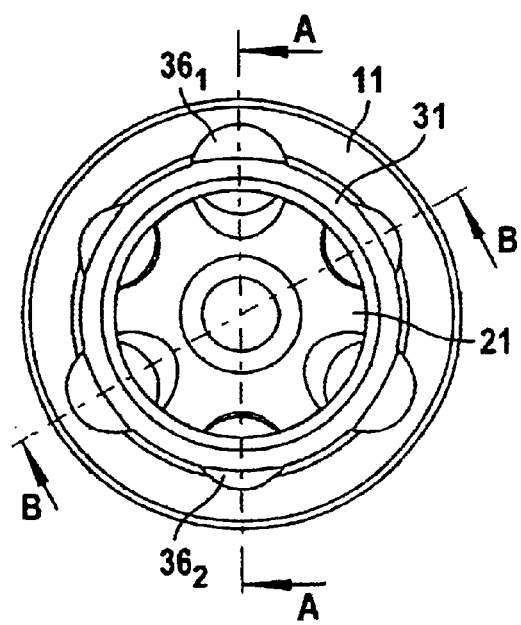
FIG. 1 shows a counter track joint according to the state of the art:
 A) in an axial view of the joint aperture;
 B) in a longitudinal section according to the sectional plane A—A; and
 C) in a longitudinal section according to the sectional plane B—B.
Figure 1B:
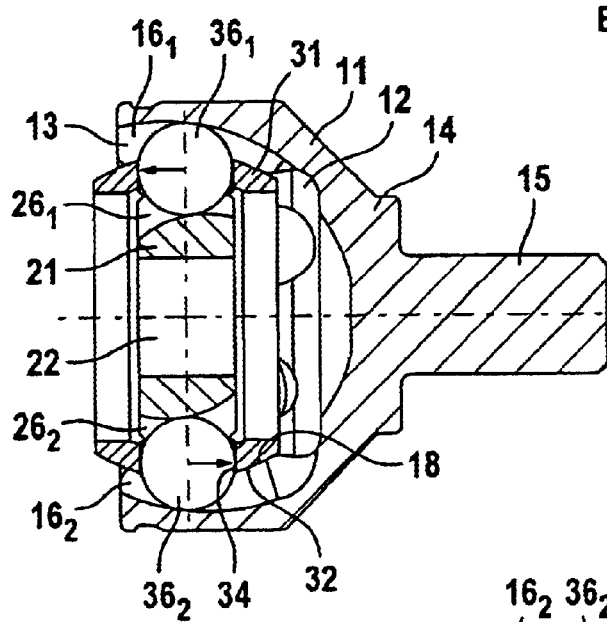
Figure 1C:
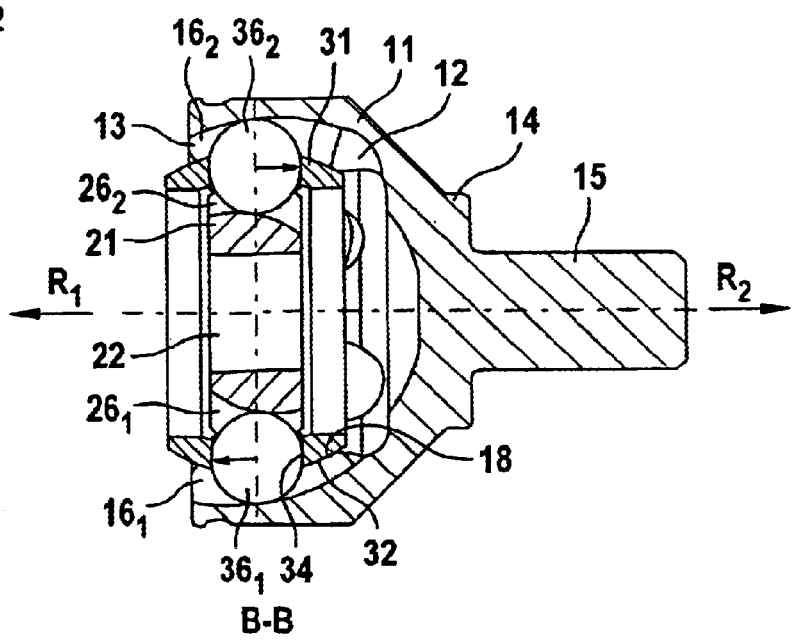

The illustrations of FIG. 1 will be described jointly below. An outer joint part 11 comprises an interior 12 with an aperture 13 and an opposed base 14. A connecting journal 15 is formed on to the base 14. In the interior 12, there is accommodated an inner joint part 21 with an inner aperture 22 for inserting a shaft journal. A ball cage 31 is arranged between the outer joint part 11 and the inner joint part 21. The joint comprises first outer tracks $16_1$ and first inner tracks $26_1$ which diverge from one another when viewed in a first direction $R_1$ which runs from the joint center to the aperture end of the outer joint part. Furthermore, the joint comprises second outer tracks $16_2$ and second inner tracks $26_2$ which diverge from one other when viewed in a second direction $R_2$ which, when viewed from the joint center, runs towards the journal end of the outer joint part. First outer tracks $16_1$ and first inner tracks $26_1$ form first pairs of tracks, with second outer tracks $16_2$ and second inner tracks $26_2$ forming second pairs of tracks. The pairs of tracks formed of inner tracks and outer tracks accommodate torque transmitting balls $36_1$, $36_2$. The ball cage 31 comprises a spherical outer face 32 which is held in a spherical inner face 18 of the outer joint part. The balls are held in windows 34 of the cage 31. In each radial section through opposing pairs of ball tracks through the entire joint, the first pairs of tracks $16_1$, $26_1$ and second pairs of tracks $16_2$, $26_2$ are positioned opposite one another, as can be seen in section A—A of FIG. 1B and in section B—B of FIG. 1C. The balls $36_1$ in the first pairs of tracks are subjected by the tracks to forces which point in the first direction $R_1$. The balls $36_2$ in the second pairs of tracks are subjected by the tracks to forces which point in the second direction $R_2$. This applies to torque transmitting conditions and leads to an internal load being applied to the cage. However, as the forces are balanced in pairs, the cage, overall, is held in the outer joint part in a condition where it is axially force-free. As a result, the friction forces between the cage and the outer joint part and the inner joint part are low when the assembled joint rotates.

In FIG. 2, the forces applied to the balls $36_1$, $36_2$ by the pairs of tracks $16_1$, $26_1$, $16_2$, $26_2$ are illustrated for four balls, and the developed view of the cage 34 shows the respective counter-forces which act on the balls and which have to be applied by the cage. With a total of six forces which act alternately in opposite directions, the cage 34 is outwardly force-free relative to the outer joint part 11 and to the inner joint part 11.

Figure 3B:
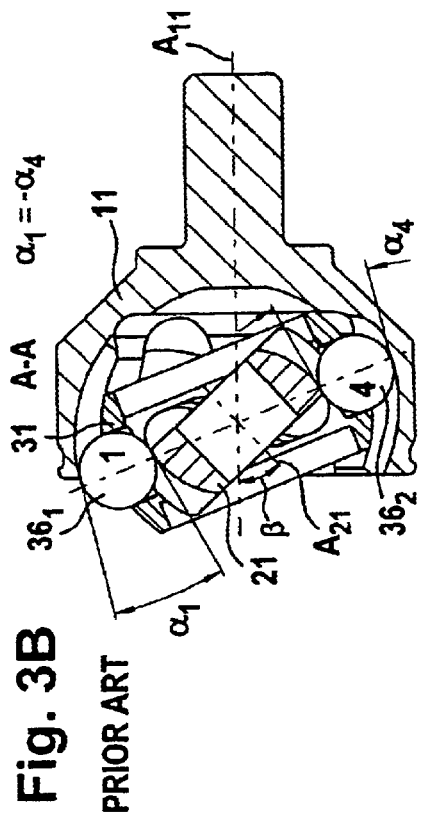
FIG. 3 shows a joint according to FIG. 1 rotating in an articulated condition:
 A) in an axial view;
 B) in a longitudinal section;
 C) in a detail comprising the cage and balls; and
 D) in an illustration of the control angle for two opposed balls.
Figure 3D:
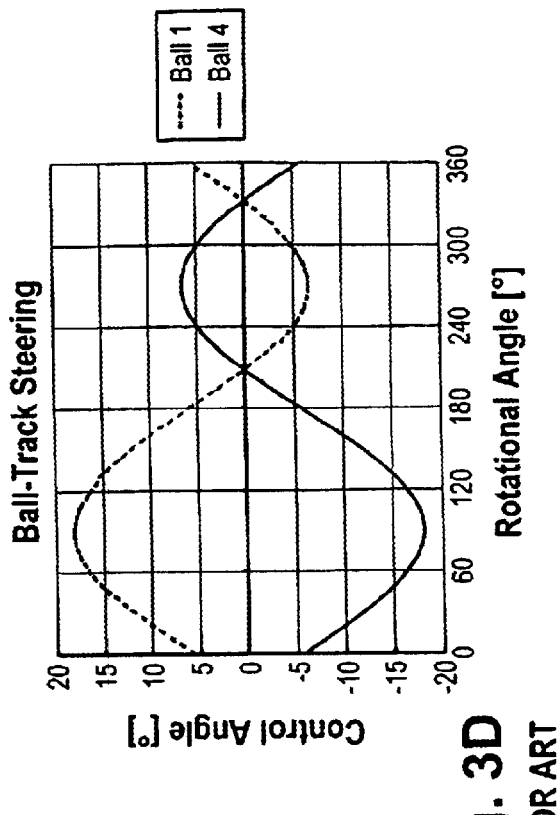
Figure 3A:
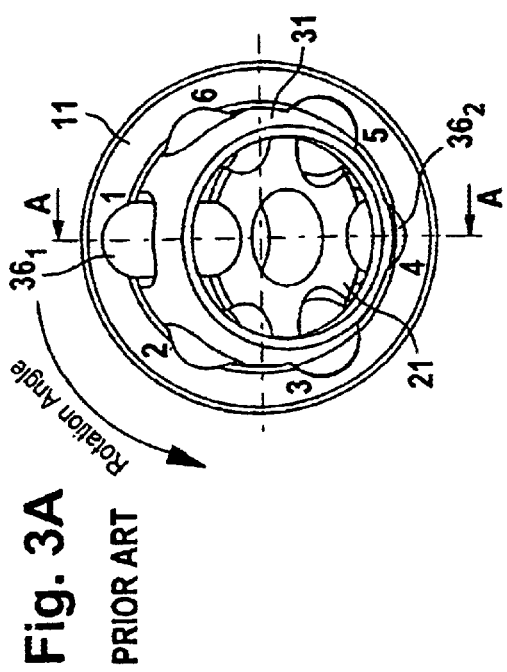
Figure 3C:
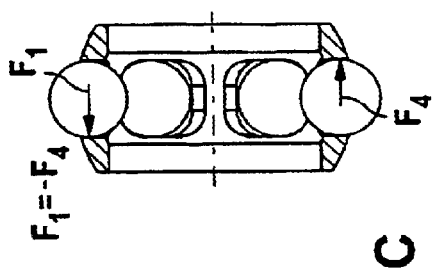

The individual illustrations of FIG. 3 will be described jointly below. A joint according to FIG. 1 is shown in an articulated condition, with an articulation angle β being set between the axis $A_{11}$ of the outer joint part 11 and the axis $A_{21}$ of the inner joint part 21. The angle between the axes $A_{11}$, $A_{21}$ is symmetrically divided by the angle-bisecting plane E. FIG. 3B is a longitudinal section through the so-called articulation plane spanned by the axes $A_{11}$, $A_{21}$. The balls are continuously numbered from 1 to 6, with the balls 1 and 4 being positioned in the articulation plane. In the points of contact between the balls 1 and 4 and the ball tracks, tangents have been drawn against the balls. The tangents at the ball 1 enclose a control angle $α_1$, and the tangents at the ball 4 enclose a control angle $α_4$ which, for reasons of symmetry, is of the same size. It is necessary to provide control angles which differ from zero, so that, upon articulation of the axes $A_{11}$, $A_{21}$, the ball tracks apply forces to the balls to enable same to control the cage on to the angle-bisecting plane E. It is permissible for the control forces at individual balls to be zero if high control forces are applied to other balls. FIG. 3D shows, quantitatively, for the balls 1 and 4, said control angles $α_1$, $α_4$ across one joint rotation with axes $A_{11}$, $A_{21}$ which are in a fixed position relative to one another. The illustration shows that, twice across the circumference, at rotational angles of 210° and 330°, the control angles of the balls 1 and 4 become zero simultaneously. Thus, according to FIG. 3C, the forces $F_1$ and $F_4$ also become zero. The forces $F_1$ and $F_4$, however, outside said angular position, form a pair of forces generating a tilting moment. Even if one takes into account that two further pairs of balls, with offset phases, act with pairs of forces deviating from zero, the cage control is relatively unsatisfactory.

Figure 4A:
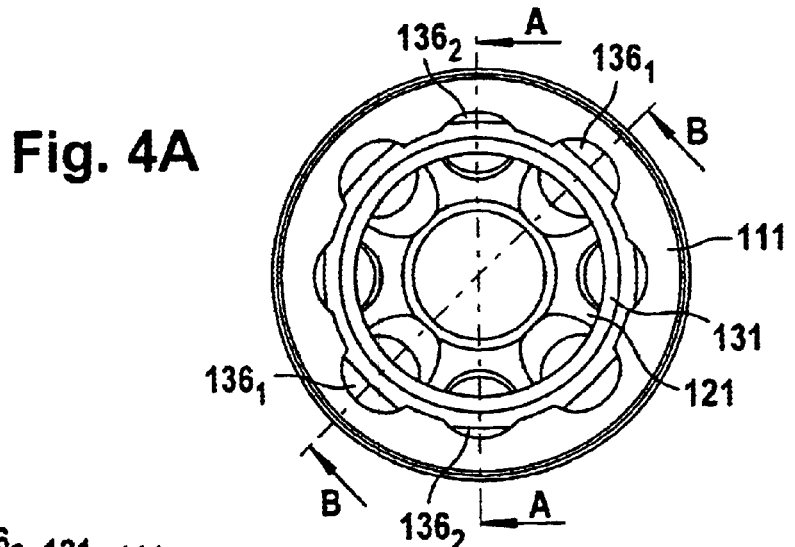
FIG. 4 shows one embodiment of a counter track joint in accordance with the present invention:
 A) in an axial view of the joint aperture;
 B) in a longitudinal section according to the sectional plane A—A; and
 C) in a longitudinal section according to the sectional plane B—B.
Figure 4B:
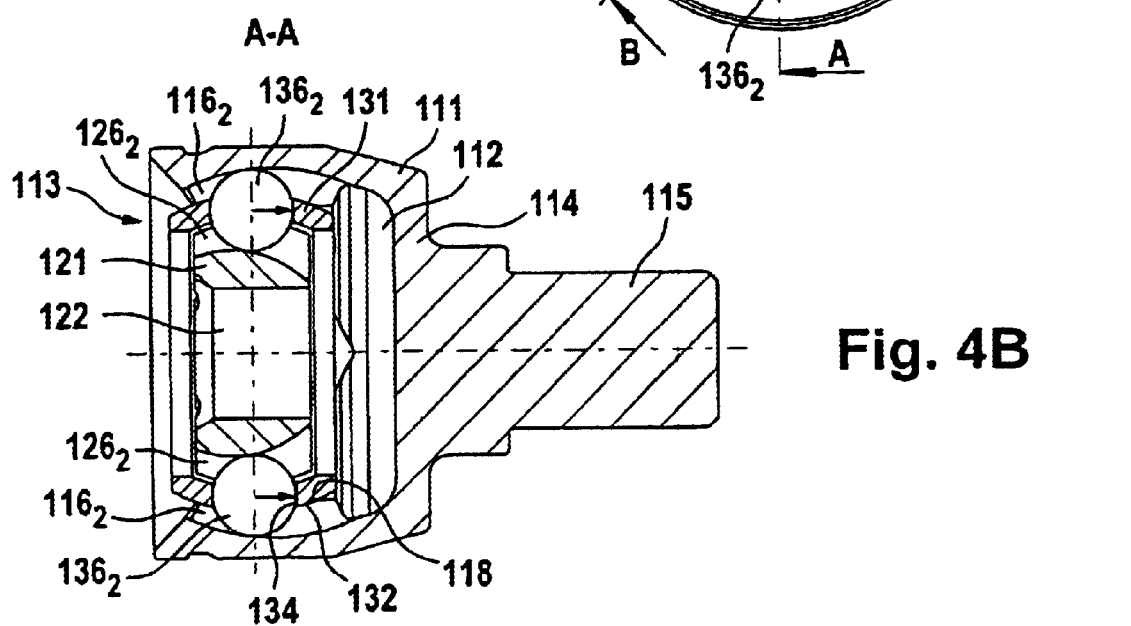
Figure 4C:
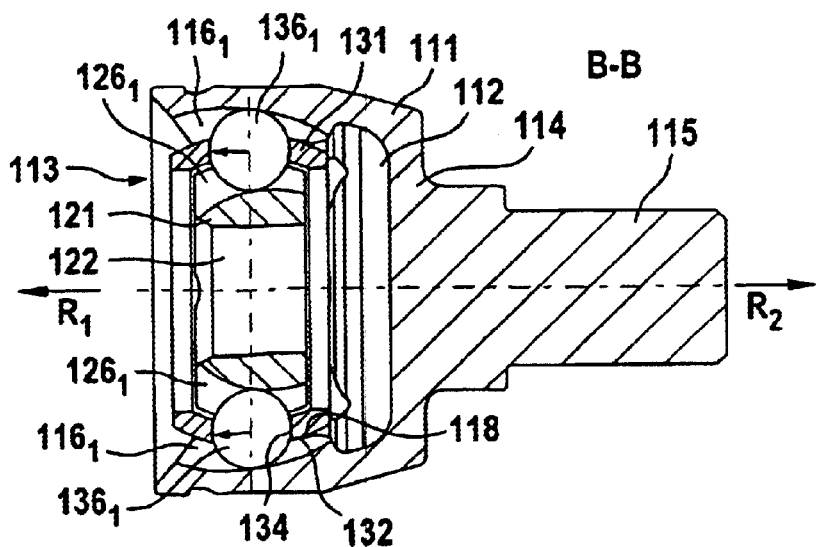

The illustrations of FIG. 4 will be described jointly below. An outer joint part 111 comprises an interior 112 with an aperture 113 and an opposed base 114. The base 114 may be integrally formed with the outer joint part 111, as shown. A connecting journal 115 is formed on to the base 114. The interior 112 contains an inner joint part 121 with an inner aperture 122 for inserting a shaft journal. Between the outer joint part 111 and the inner joint part 121 there is arranged a ball cage 131. The joint comprises first outer tracks $116_1$ and first inner tracks $126_1$ which diverge from one another when viewed in the first direction $R_1$ which points from the joint center to the aperture end of the outer joint part. Furthermore, the joint comprises second outer tracks $116_2$ and second inner tracks $126_2$ which diverge from one another when viewed in a second direction $R_2$ which, if viewed from the joint center, points towards the journal end of the outer joint part. First outer tracks $116_1$ and first inner tracks $126_1$ form first pairs of tracks with one another. Second outer tracks $116_2$ and second inner tracks $126_2$ form second pairs of tracks with one another. The pairs of tracks formed of inner tracks and outer tracks accommodate torque transmitting balls $136_1$, $136_2$. The ball cage 131 comprises a spherical outer face 132 which is held in a spherical inner face 118 of the outer joint part. The balls are held in the windows 134 of the cage 131 and, resultingly, the balls are held in a common plane and guided onto the angle-bisecting plane when the point is articulated. In radial sections through ball tracks through the entire joint, first pairs of tracks are positioned opposite another first pair of tracks, as can be seen in section B—B of FIG. 4C. Second pairs of tracks are positioned opposite another second pair of tracks, as can be seen in section A—A of FIG. 4B. The balls $136_1$ in the first pairs of tracks $116_1$, $126_1$ are subjected by the tracks to forces which point in the first direction $R_1$. The balls $136_2$ in the second pairs of tracks $116_2$, $126_2$ are subjected by the tracks to forces which point in the second direction $R_2$. This applies to torque transmitting conditions and leads to an internal load being applied to the cage. However, as the forces are balanced in pairs, the cage, overall, is held in the outer joint part in a condition where it is axially force-free. As a result, the friction forces between the cage and the outer joint part and the inner joint part are low when the assembled joint rotates.

In FIG. 5, in a sectional view, the forces applied to the balls by the pairs of tracks are illustrated for five balls, and the developed view of the cage shows the respective counter-forces which act on the balls and which have to be applied by the cage. With a total of eight forces which act alternately in opposite directions, the cage is outwardly force-free.

Figure 6B:
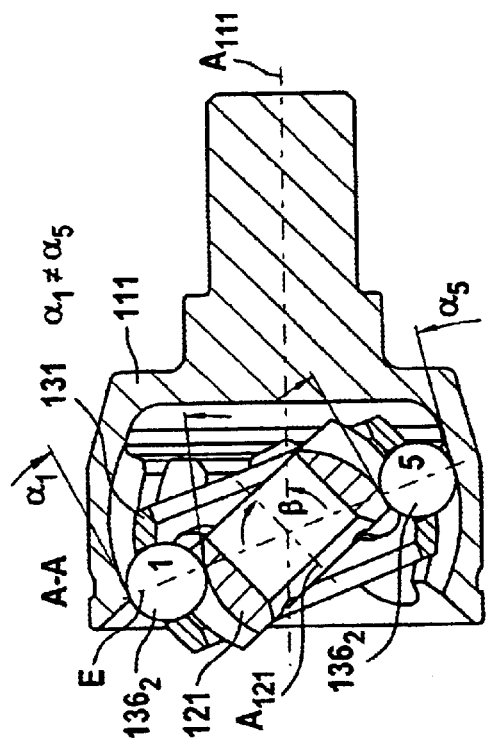
FIG. 6 shows a joint according to FIG. 4 rotating in an articulated condition:
 A) in an axial view;
 B) in a longitudinal section;
 C) in a detail comprising the cage and balls; and
 D) in an illustration of the control angle for two opposed balls.
Figure 6D:
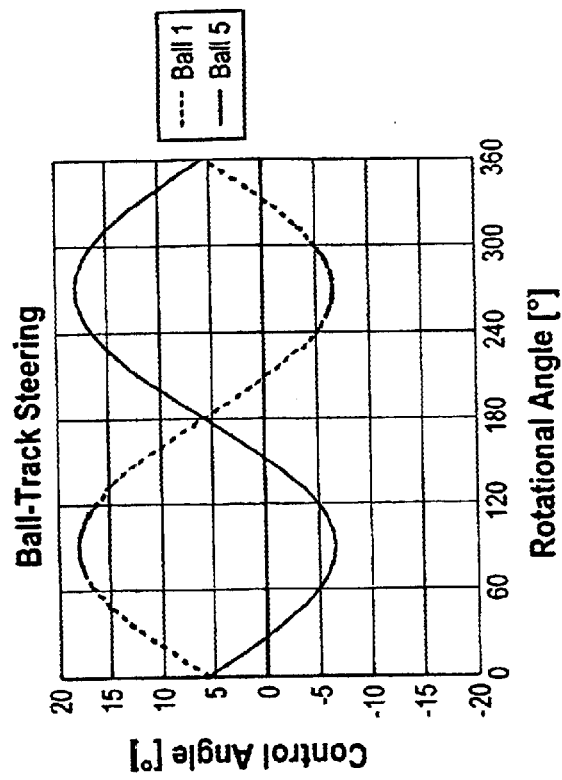
Figure 6A:
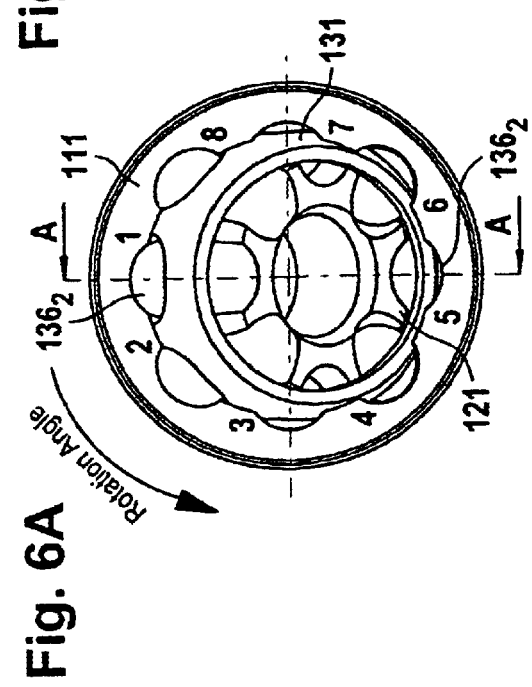
Figure 6C:

The individual illustrations of FIG. 6 will be described jointly below. A joint according to FIG. 4 is shown in an articulated condition, with an articulation angle β being set between the axis $A_{11}$ of the outer joint part 111 and the axis $A_{21}$ of the inner joint part 121. The angle between the axes $A_{11}$, $A_{21}$ is symmetrically divided by the angle-bisecting plane E. FIG. 6B is a longitudinal section through the so-called articulation plane spanned by the axes $A_{11}$, $A_{21}$. The balls are continuously numbered from 1 to 8, with the balls 1 and 5 being positioned in the articulation plane. In the points of contact between the balls 1 and 5 and the ball tracks, tangents have been drawn against the balls; The tangents at the ball 1 enclose a control angle $α_1$ and the tangents at the ball 5 enclose a control angle $α_5$ which, for reasons of symmetry, is of the same size. It is necessary to provide control angles which differ from zero, so that, upon articulation of the axes $A_{11}$, $A_{21}$, the ball tracks apply forces to the balls to enable same to control the cage on to the angle-bisecting plane E. It is permissible for the control forces at individual balls to be zero if high control forces are applied to other balls. FIG. 6D shows, quantitatively for the balls 1 and 5, said control angles $\alpha_1$, $\alpha_5$ across one joint rotation with axes $A_{11}$, $A_{21}$ which are in a fixed position relative to one another. The illustration shows that, for each of the balls 1 and 5, twice across the circumference, i.e. at rotational angles of 30° and 150°, the control angle $\alpha_1$ for the ball 1 and at rotational angles of 210° and 330°, the control angle $\alpha_5$ of the ball 5 becomes zero, but the control angle of the respective ball positioned radially opposite always deviates from zero. Thus, also the pair of forces forme 4 by the forces $F_1$ and $F_4$, which generates a tilting moment, constantly deviates from zero. As a result, the cage control is extremely advantageous at all angles of rotation.

While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. A constant velocity fixed ball joint in the form of a counter-track joint comprising;

an outer joint part with outer tracks;

an inner joint part with inner tracks;

torque-transmitting balls each accommodated in an outer track and inner track; and a ball cage with cage windows in which the balls are held in a common plane and guided on to the angle-bisecting plane when the joint is articulated, wherein first outer tracks and first inner tracks, form first pairs of tracks which diverge from one another running in a first axial direction towards a connection end of the inner joint part and hold first balls, and wherein second outer tracks and second inner tracks form second pairs of tracks which diverge from one another running in a second axial direction towards a connection end of the outer joint part and hold second balls wherein said first axial direction is opposite in sense with respect to said second axial direction, and the total pairs of tracks equal at least eight, wherein each first pair of tracks is positioned radially opposite another first pair of tracks and each second pair of tracks is positioned radially opposite another second pair of tracks and wherein the first pairs of tracks and second pairs of tracks are arranged so as to alternate around the circumference of the joint.

2. A joint according to claim 1 comprising twelve or sixteen pairs of tracks.

3. A joint according to claim 2, wherein, at its connection end, the outer joint part comprises an integrally formed-on joint base.

4. A joint according to claim 1, wherein, at its connection end, the outer joint part comprises an integrally formed-on joint base.

* * * * *